United States Patent [19]

Ohsaki et al.

[11] 4,371,452

[45] Feb. 1, 1983

[54] PROCESS FOR HYDROCARBON REFORMING AND APPARATUS THEREFOR

[75] Inventors: Kozo Ohsaki, Funabashi; Kazuo Hirokawa; Goro Fukuda, both of Chiba; Kozi Otsuka, Mobara; Tadayoshi Tomita, Yokohama, all of Japan

[73] Assignee: Toyo Engineering Corporation, Japan

[21] Appl. No.: 328,822

[22] Filed: Dec. 9, 1981

Related U.S. Application Data

[63] Continuation of Ser. No. 149,638, May 14, 1980, abandoned.

[30] Foreign Application Priority Data

May 18, 1979 [JP] Japan ................................. 54/60271

[51] Int. Cl.³ .............................................. C01B 3/38
[52] U.S. Cl. ................................ 252/373; 48/214 A;
422/197; 422/204; 422/211
[58] Field of Search ....................... 252/373; 48/214 A

[56] References Cited

U.S. PATENT DOCUMENTS 2,593,584  4/1952  Lynch .
2,668,101  2/1954  Arnold et al. .
2,692,193  10/1954 Riesz et al. .
3,446,594  5/1969  Buswell et al. .
3,607,125  9/1971  Kydd .
3,713,784  1/1973  Hess et al. .
3,957,681  5/1976  Tomita et al. .
3,969,542  7/1976  Tomita et al. .
4,026,679  5/1977  Collins .
4,101,449  7/1978  Noda et al. .

FOREIGN PATENT DOCUMENTS 489592  6/1970  Switzerland .
822615  10/1959 United Kingdom .

*Primary Examiner*—Howard T. Mars
*Attorney, Agent, or Firm*—McGlew and Tuttle

[57] ABSTRACT

Disclosed is a process for reforming hydrocarbon which comprises heating up to 800° C. or higher a gaseous mixture of sulfur containing hydrocarbon with an oxidizing agent for reforming such as steam or a mixture of steam and carbon dioxide, while passing the gaseous mixture through an alkaline solid packing bed containing alkali metal and/or alkaline earth metal followed by bringing into contact thereof with a nickel containing catalyst at a temperature of 800° C. or higher to produce a mixed gas containing hydrogen and carbon monoxide. An apparatus for the practice of the process is also disclosed.

2 Claims, 5 Drawing Figures

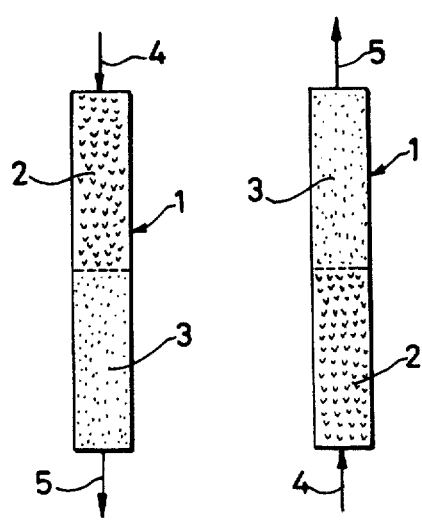
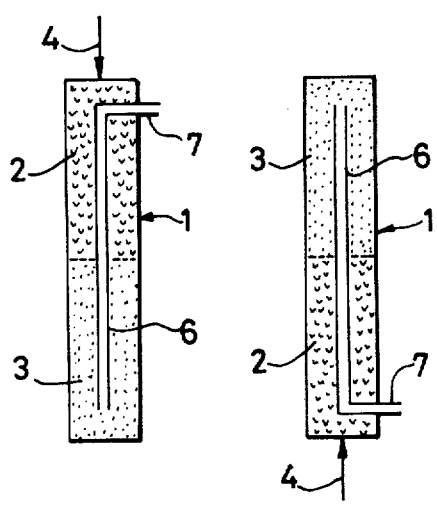
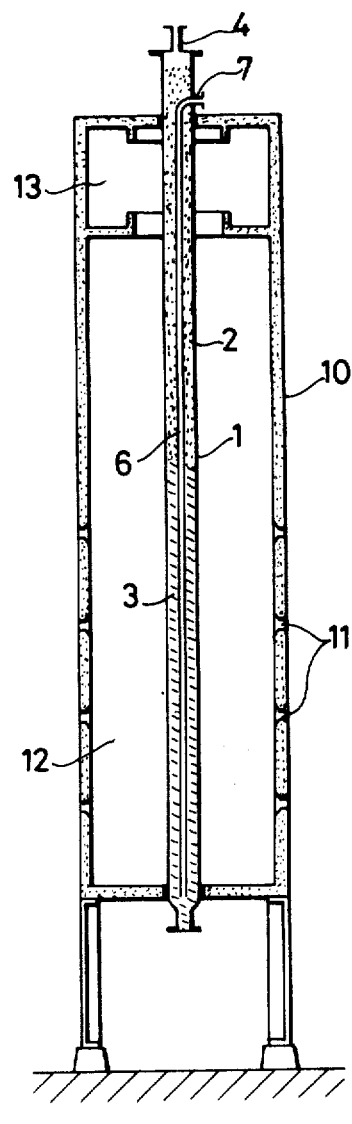

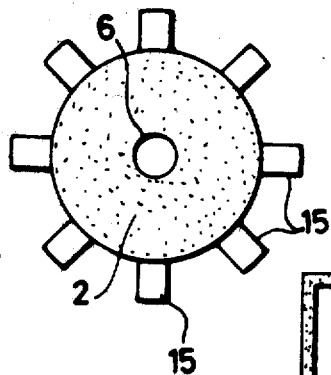
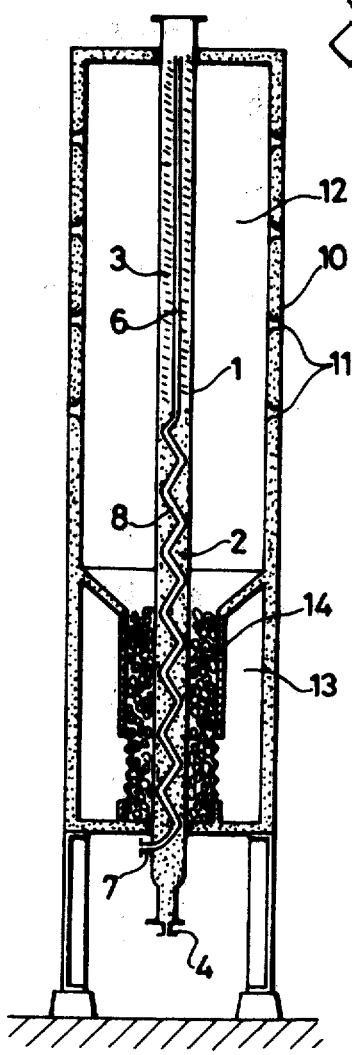
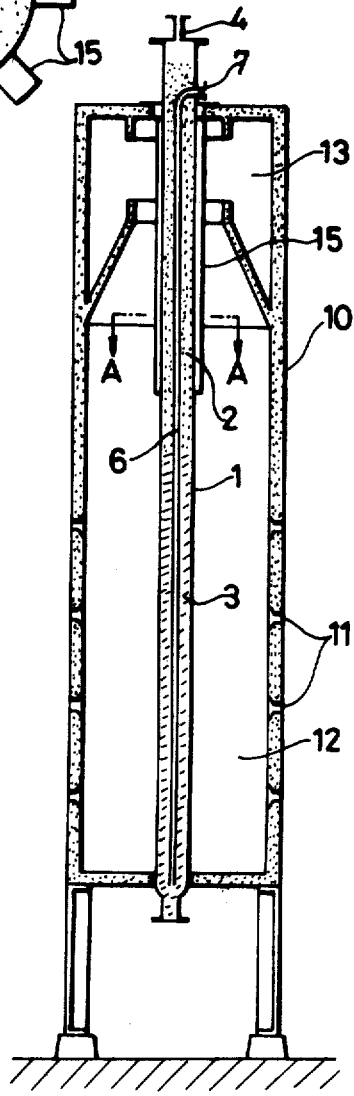

PROCESS FOR HYDROCARBON REFORMING AND APPARATUS THEREFOR

This is a continuation of application Ser. No. 149,638, filed May 14, 1980, now abandoned.

BACKGROUND OF THE INVENTION (a) Field of the Invention

This invention relates to a process for producing a gaseous mixture containing hydrogen and carbon monoxide in which sulfur containing hydrocarbon is directly subjected to steam reforming without being desulfurized in advance, and also relates to an apparatus therefor.

(b) Description of the Prior Art

Sulfur containing hydrocarbon, particularly extracted oil such as kerosene, gas oil, vacuum distillation gas oil and the like, obtained by subjecting petroleum to atmospheric distillation and vacuum distillation, contains a considerable amount of sulfur, for example, 40 to 100 ppm for commercially available desulfurized kerosene, 200 to 1,500 ppm for gas oil, and more for vacuum distillation gas oil. Accordingly, this sulfur containing hydrocarbon is unable to be subjected directly to steam reforming in the presence of the conventional nickel containing catalyst.

The technical problems to be solved in a process for steam reforming, in which light hydrocarbon such as butane and naphtha is subjected to steam reforming with an oxidizing agent for reforming such as steam at a high temperature of from 500° to 850° C. in the presence of a nickel containing catalyst, consist in maintenance of the activity of the nickel containing catalyst and prevention of carbon deposition on the catalyst, and many conventional processes therefor have been proposed so far and have been brought into industrial practice. However, all the conventional processes of steam reforming mentioned above have such drawback that light hydrocarbons as raw material must be subjected to desulfurization in advance so that sulfur may substantially be removed. Sulfur contained in a raw material converts nickel in the catalyst to nickel sulfide, whereby the activity of the catalyst is lost and deposition of carbon is caused, which makes a long-run operation impossible. As the sulfur content in the raw material is increased, troubles due thereto are increased.

There is a description regarding the above at page 69 of an article titled by "Production of Hydrogen Naphtha Steam Reforming" beginning at page 66, No. 10, Vol. 21, "Petroleum & Petrochemistry", which states as follows: "A complete steam reforming of light gas oil (LBP/FBP=134° C./314° C.) by the use of a laboratory apparatus under the same conditions as in the production of ammonia synthesis gas is attained. However, the insufficient desulfurization (20 ppm) of the raw material causes to poison the catalyst, and 2 to 3 hours later a part of the raw material is not subjected to reforming and leaves the catalyst bed as it is to be contained in outlet gas." Clearly, the above description shows that even 20 ppm of sulfur cause to lose the activity of the catalyst within a short period of time of 2 to 3 hours. Accordingly, the raw material must be subjected to a desulfurization process such as hydrodesulfurization in advance so that the sulfur content in the raw material may be less than 1 ppm, preferably less than 0.1 ppm before being subjected to steam reforming in order to make possible to long-run operation.

Most of sulfur compounds contained in a light fraction such as naphtha are generally thiols and sulfides, and the sulfur moiety thereof can more readily be removed by hydrodesulfurization. However, sulfur compounds contained in a heavy fraction such as kerosene are mainly thiophenes, which are extremely difficult to be desulfurized by hydrodesulfurization from technical and economical viewpoints.

As mentioned above, the conventional processes for high temperature steam reforming of hydrocarbon by use of a nickel containing catalyst have a drawback that sulfur in the raw material must be removed in advance, but desulfurization of heavy fractions is difficult technically as well as economically. Therefore the raw materials containing such heavy fractions are unable to be subjected to steam reforming.

With respect to chemical raw material, an emphasis must be put on the saving of resources, and application of heavier and diversified raw material taking the future shortage of petroleum resources into consideration. Accordingly, developments of a process for hydrocarbon steam reforming and an apparatus therefor are highly demanded, in which heavy fractions obtained by removing atmospheric and vacuum distillation residue of petroleum can be widely used as raw materials, and sulfur containing material can also be used without need to be desulfurized in advance.

SUMMARY OF THE INVENTION

An object of this invention is to provide an improved process for steam reforming of sulfur containing hydrocarbon.

Another object of this invention is to provide an improved process, in which sulfur containing heavy fractions are also applicable as raw material.

A further object of this invention is to provide a process for steam reforming, in which sulfur containing hydrocarbons are available as raw materials without being desulfurized in advance.

A still further object of this invention is to provide an apparatus for the practice of the above processes.

According to the present invention, there is provided a process for steam reforming, in which a gaseous mixture of a hydrocarbon containing sulfur compounds with an oxidizing agent for reforming such as steam or a mixture of steam and carbon dioxide is heated for decomposition, while passing the mixture through an alkaline solid packing bed containing alkali metal and/or alkaline earth metal, and then passed through a nickel containing catalyst bed at a temperature of 800° C. or higher to produce a mixed gas containing hydrogen and carbon monoxide.

BRIEF DESCRIPTION OF THE DRAWINGS

In the attached drawings,

FIG. 1 is an explanatory view of one embodiment of the present invention;

FIG. 2 is an explanatory view of another embodiment of the present invention;

FIG. 3 is a vertical section illustrating one embodiment of the apparatus for the practice of the present invention;

FIG. 4 is a vertical section illustrating another embodiment of the apparatus for the practice of the present invention; and FIG. 5 is a vertical section illustrating a further embodiment of the apparatus for the practice of the present invention.

THE DETAILED DESCRIPTION OF THE INVENTION

The conventional high temperature steam reforming by use of nickel containing catalyst is effected at 500° to 850° C. In the above temperature range, sulfur contained in the raw material causes to convert nickel in the catalyst into nickel sulfide, which results in the lose of activity of the catalyst and in the deposition of carbon on the catalyst, and makes a long-run operation impossible. Depending on the amount of sulfur contained therein, that is, at a high temperature of 800° C. or higher for a low sulfur content, or of 900° C. or higher for a high sulfur content, nickel in the catalyst is mostly present in the form of nickel from its equilibrium, so that the activity of the catalyst can be maintained without deposition of carbon. A reforming at a high temperature of 800° C. or higher was effected taking the above fact into consideration to find out problems to be solved technically.

That is, the high temperature reforming involves heating up to a high temperature of 800° C. sulfur containing hydrocarbon alone or with an oxidizing agent for reforming, and it was found that in the case of hydrocarbons which are liquid at room temperature, deposition of carbon occurs in the course of heating to 800° C. The carbon deposition in the course of heating up as mentioned above makes it impossible to effect the subsequent steam reforming by use of nickel catalyst. Many experiments showed that heating up from a temperature range of 350° to 600° C. to 800° C. for decomposition through an alkaline solid packing bed free of nickel and containing alkali metal and alkaline earth metal causes no deposition of carbon.

The alkaline solid packing may be composed of an alkali metal or alkaline earth metal oxide and oxide of aluminum, and preferably is free of nickel. At a temperature lower than 800° C. escaping of potassium is so little that it is desirable to incorporate an ingredient such as potassium which serves to prevent carbon deposition.

Thus, the produced gas containing lower hydrocarbons and other gases thus formed is then introduced into a nickel containing catalyst bed and is subjected to steam reforming therein at least at 800° C. or higher, preferably 900° to 1,000° C., whereby the activity of the catalyst is maintained, and a long-run continuous operation is made possible without any carbon deposition. A nickel containing catalyst used in the present invention is employed at a temperature higher than 800° C., and there is no need of incorporating a carbon deposition preventing ingredient such as potassium which escapes at such high temperatures, because the gaseous state of the mixture introduced into the catalyst bed and the activity of the catalyst are readily maintained. The catalyst usd is prepared by incorporating a given amount of nickel into one or more of oxides of the elements belonging to Group II such as beryllium, magnesium, calcium, strontium, barium, and the like, and the oxide of aluminum belonging to Group III.

The alkaline solid packing used may include, for example, those described in U.S. Pat. No. 3,969,542, and further may include other alkaline solid packings known in the art. The nickel catalyst used may include, for example, those disclosed in U.S. Pat. No. 4,101,449, and other nickel containing catalysts used for hydrocarbon reforming known in the art.

There is no restriction on the pressure employed from the reaction, but the pressure employed is naturally limited by restrictions on the material of the reactor.

The temperature in the alkaline solid packed bed and the nickel containing catalyst bed varies with the configuration, amount, and the like of the hydrocarbon material and sulfur compounds. Temperatures should be used which do not cause decomposition at the inlet of the alkaline solid packed bed. The temperature should be 800° C. or higher, and preferably 900° to 1,000° C. at the outlet thereof, while the reaction in the nickel containing catalyst bed is effected at 800° C. or higher, preferably 900° to 1,000° C.

In FIG. 1, a reactor 1 is provided with a packed bed 2 of an alkaline solid packing and a packed bed 3 of a nickel containing catalyst therein, and is externally supplied with the heat necessary for steam reforming. Hydrocarbon as raw material is mixed with steam in the form of gas, and is introduced into the reactor 1 through a conduit 4 at 350° to 600° C. The hydrocarbon-steam mixture is heated up to 800° C. or higher for decomposition in the alkaline solid packed bed, and then decomposed completely at 800° C. or higher in the nickel containing catalyst bed to form a mixture containing hydrogen and carbon monoxide, which is taken out of the reactor through a conduit 5. In FIG. 1, (a) and (b) show the cases where the flow of hydrocarbon-steam mixture and the gaseous mixture so formed is in the opposite direction from each other.

The temperature of the hydrocarbon-steam mixture introduced into the reactor 1 varies with the boiling point range of the hydrocarbon raw material, and is selected from temperatures in the range of from 350° to 600° C. In the case of liquid hydrocarbons, carbon deposition must not occur in the step of evaporation-preheating thereof. Gas oil and vacuum distillation gas oil were considered to cause carbon deposition even at 500° C., but the present inventors found that the rate of carbon formation is so low that a continuous operation is made possible without carbon deposition by shortening the residence time in the step of evaporation-preheating thereof. However, a temperature above 600° C. should be avoided because the rate of carbon deposition becomes high at 600° C. and above to cause clogging of pipes and so forth.

EXAMPLE 1

In the inlet portion of a reaction tube having an inner diameter of 60 mm, the length of which is ⅔ the total length of the reaction tube, an alkaline solid packing containing 12 CaO.7 Al$_2$O$_3$ as its major ingredient was packed, and over the remaining ⅓ the length of the reaction tube a catalyst prepared by supporting 15% by weight of Ni on a carrier containing 12 CaO.7 Al$_2$O$_3$ as its major ingredient was packed. Gas oil having a boiling temperature of from 210° to 353° C. and containing 900 ppm of sulfur was used as stock oil. The stock oil was mixed in the gas phase with steam at a flow rate of 1.34 kg/hr to yield a ratio of [steam moles]/[number of carbon atoms] 3.5, and the mixture was fed into the inlet of the alkaline solid packing bed under 20 kg/cm$^2$G at 400° C., heated up to 900° C. therein, and then subjected to reaction in the nickel containing catalyst bed at 950° C. to obtain the following results:

| | | |
|---|---|---|
| Amount of gas formed | 5 Nm$^3$/hr | |
| Composition of gas formed | H$_2$ | 59.3% by volume |

|  |  |
|---|---|
| CH₄ | 14.6% by volume |
| CO | 11.6% by volume |
| CO₂ | 14.5% by volume |
| H₂S + COS | 180 ppm |

During operation no carbon was observed in the gas formed, and an examination of the reaction tube after completion of the run found no carbon deposition.

The conventional hydrocarbon steam reforming was heretofore limited to the application to a naphtha fraction having a boiling point of about 220° C. or lower technically and economically, and was applicable only to a substantially desulfurized material. However, in accordance with the process of the present invention, steam reforming can be effected without carbon deposition over a wide range of material from sulfur containing methane to heavy petroleum fractions except for residual oil. Steam reforming of liquid hydrocarbons free of sulfur can apparently be effected without carbon deposition. The above fact shows that the present invention has a great effect especially in the case of a petroleum fraction, desulfurization of which is difficult technically as well as economically prior to subjecting to steam reforming, or in the case where the incorporation of sulfur in the gas formed by steam reforming is allowable.

The present invention also has the advantage that sulfur compounds contained in the raw material and difficult to be desulfurized can be converted into H₂S or COS by subjecting them to the steam reforming of the present invention. The substantially complete desulfurization the thus-formed H₂S or COS can be readily attained by the conventional acid gas removal technique.

Another embodiment provides a preferred process for the practice of the present invention. A first embodiment mentioned above is effected at a temperature higher than the reaction temperature of conventional steam reforming, that is, 800° C. or higher, so that an increase in utilization of thermal energy is more desirable than ever. FIG. 2 is an explanatory view of this embodiment. The process shown in this embodiment differs from that shown in FIG. 1 in that a formed gas conduit 6 passing through an alkaline solid packing bed 2 and a nickel containing catalyst bed 3 packed in a reaction tube 1 is provided therewith. A high temperature gas formed by steam reforming in the nickel containing catalyst bed 3 is introduced into the formed gas conduit 6. As the gas so formed passes through the formed gas conduit 6, the sensible heat of the formed gas is fed to the gas passing through the nickle containing catalyst bed and alkaline solid packing bed by indirect heat exchange. Then the formed gas is discharged out of the reactor through a formed gas discharge conduit 7.

EXAMPLE 2

Example 1 was repeated except that a formed gas conduit 6 having an inner diameter of 10 mm was fitted in the reaction tube 1 of Example 1, where the temperature of an outlet of the formed gas conduit 6 (an inlet of a conduit 7) was 590° C. Both the amount and composition of the formed gas were the same as those in Example 1. In Example 2, an amount of fuel was saved equal to 31% compared with Example 1 as shown below.

|  | Example 1 | Example 2 |
|---|---|---|
| Temperature of hydrocarbon-steam gaseous mixture (°C.) | 400 | 400 |
| Formed gas outlet temperature (°C.) | 950 | 590 |
| Combustion gas discharge temperature (°C.) | 980 | 980 |
| Ratio of amounts of fuel consumed | 1 | 0.69 |

Specification of the relationship with a furnace and burners which supply heat with the reaction tube in the above two embodiments are described below. The above specification means an apparatus in which a plurality of vertical reaction tubes provided with an alkaline solid packing bed and nickel containing catalyst bed is fitted in parallel to form a furnace, and the reaction tubes are heated by a plurality of side wall burners on the side wall of the furnace positioned faced mainly toward the nickel containing catalyst bed.

The amount of heat and temperature level needed in the alkaline solid packing bed, where hydrocarbon-steam mixture is heated from a temperature of 350° to 600° C. or higher for thermal decomposition, may be at a lower than those in the nickel containing catalyst bed, where the temperature is maintained at 800° C. or higher therethrough. However, the application of top firing system or bottom firing system, which has been widely used, as main heating means cannot avoid local heating. Accordingly, in the practice of a first and second embodiments, a side firing system is adopted as a main heating means, by which system the amount of combustion can be controlled over a wide range according to the amount of heat absorbed in a zone corresponding to the nickel containing catalyst bed, which makes possible the prevention of localized heating of the reaction tube and saving of fuel. Many experiments showed that it is desirable from the standpoint of heat economy that the side wall burners fitted in the present embodiments be fitted on the side wall of the furnace positioned faced to the nickel containing catalyst bed to supply the reforming zone at a high temperature level with heat, and then the alkaline solid packing bed is supplied with heat while the combustion gas moves to leave a radiation heat transfer zone.

FIG. 3 is one embodiment for the practice of the process of the present invention. In FIG. 3, a radiation heat transfer portion of a heating furnace 10 is provided with a plurality of reaction tubes in parallel, a reaction tube 1 is provided with an alkaline solid packing bed 2 in the upper part thereof and a nickel containing catalyst bed 3 in the lower part thereof, a formed gas conduit 6 passing through both beds has an opening for one tip thereof at the bottom of the reaction tube, and another tip of the formed gas conduit 6 has an opening 7 out of an upper portion of the reaction tube. A plurality of side wall burners 11 are fitted on both side walls corresponding to the nickel containing catalyst bed in the reaction tube 1. The combustion gas from the side wall burners 11 is discharged to a convection heat transfer portion (not shown in Figure) through a duct 13 fitted in an upper portion of the heating furnace. In FIG. 3, a formed gas conduit 6 of the second embodiment mentioned above is fitted therein, a gaseous hydrocarbon-steam mixture at 350° to 600° C. is branched to be fed to each reaction tube 1 through a conduit 4, is supplied with heat from the combustion gas passing outside the reaction tube and the formed gas in the formed gas conduit 6 to be heated up for decomposition to a desired temperature of 800° C. or higher, and then is supplied with heat from the combustion gas passing outside the reaction tube and the formed gas in the formed gas conduit 6 for steam reforming at 800° C. or higher in the nickel containing catalyst bed, the high temperature formed gas flowing into the formed gas conduit 6 and flows up therethrough to be discharged from a formed gas discharge conduit 7. In the case where the first embodiment mentioned above is applied, the formed gas conduit 6 is not fitted therein, so that the formed gas is discharged out of the reaction tube to be subjected to waste heat recovery after being discharged out of the heating furnace. It should be apparently understood that in the case where the flow of the hydrocarbon-steam gaseous mixture and the formed gas are in the opposite direction respectively upwardly or downwardly, each element is fitted in the opposite direction upwardly or downwardly.

In FIG. 3, an explanation was given with respect to a plurality of reaction tubes fitted in parallel, and the arrangement of the reaction tubes may be of a linear or zigzag configuration in a plane view. The side wall burners may be arbitrarily designed so as to be of an equal capacity, or of a small capacity for the upper portion thereof and a large capacity for the lower portion thereof.

EXAMPLE 3

Under the same conditions described in Example 1 and 2, the side wall burners in FIG. 3 were so arranged that the combustion gas outlet temperature (an inlet of the duct 13) may be 800° C. The amount of fuel consumed was reduced to 56% the amount in Example 1, while the amount in Example 2 was reduced to 69% the amount in Example 1. That is, the amount of fuel consumed in Example 3 was reduced to 81% the amount in Example 2.

The following embodiment is such that a heat conductive packing, for example, an inert ball such as alumina ball is packed at the outlet of the radiation heat transfer portion of the combustion gas in order to improve heat transfer therein, or fins are fitted on the outer side wall of the corresponding portion thereto of the reaction tube. Further saving in the amount of fuel combustion in the heating furnace may preferably attained by lowering the temperature of combustion gas discharged from the furnace as much as possible. However, as the combustion gas temperature is lowered, the radiation heat transfer is remarkably reduced and the connection heat transfer becomes predominant, so that the rate of heat transfer is greatly reduced. As a result, fuel may be saved, but it was necessary to lengthen the expensive reaction tube or to increase the number of reaction tubes in order to increase the heat transfer area. The present inventors made many studies on lowering the temperature of the combustion gas discharged from the furnace and maintaining the rate of heat transfer at a high level for the saving of fuel consumed to provide this embodiment. FIG. 4 shows an apparatus of this embodiment, in which the flow of the hydrocarbon-steam mixture flowing into the reaction tube 1 and the formed gas in the embodiment shown in FIG. 3 are in the opposite direction to that in FIG. 3, and the latter half of the formed gas conduit 6 is of a coil-shaped tube 8 instead of a linear tube. The rate of heat transfer can remarkably be improved by fitting an inert ball-packed portion 14 and by making the latter half of the formed gas conduit 6 a coil-shaped tube 8. The inert ball may preferably be of an appropriate shape and size and be made of a material with resistance to heat and a good heat conductivity. FIG. 5 shows a variation of the apparatus shown in FIG. 4, in which a fin 15 is fitted on a portion of the outer side wall positioned faced to the alkaline solid packing bed of the reacting tube 1 in order to improve the rate of heat transfer. The fin 15 may be of a plate-like or rod-like projection stud or anything capable of increasing heat transfer area.

EXAMPLE 4

An experiment is made under the same conditions as in Example 3 with an apparatus fitted with a plate-like vertical fin as shown in FIG. 5. The amount consumed of fuel is saved by 11% compared with that in Example 3.

What is claimed is:

1. In a process for reforming hydrocarbons in which a gaseous mixture of a sulfur-containing liquid hydrocarbon selected from the group consisting of kerosene, gas oil and vacuum distillation gas oil, and an oxidizing agent for reforming is brought into contact with a catalyst to convert the mixture into a mixed gas containing hydrogen and carbon monoxide, the improvement comprising:
    (a) evaporating by heating said liquid hydrocarbon in the mixture of said oxidizing agent to form said gaseous mixture at a temperature of from 350° C. to 600° C.;
    (b) further heating said gaseous mixture from step (a) to a temperature above 800° C. while passing said gaseous mixture through a bed of aluminum oxide and an alkali metal oxide and/or alkaline earth metal oxide;
    (c) passing said gaseous mixture from step (b) through a nickel-containing catalyst bed at a temperature above 800° C. to convert said gaseous mixture into said mixed gas, said nickel-containing catalyst being composed of at least one metal oxide selected from oxides or beryllium, magnesium, calcium, strontium, barium and aluminum with nickel incorporating therein, whereby the sulfur compound contained in said liquid hydrocarbon is converted into readily desulfurizable $H_2S$ and/or COS; and
    (d) passing said mixed gas discharged from step (c) countercurrently to the flow of said gaseous mixture of sulfur-containing liquid hydrocarbon and oxidizing agent in a heat-exchange zone passing through said bed of step (b) and said catalyst bed of step (c), whereby the sensible heat of said discharged mixed gas is utilized in said reforming and for heating up said gaseous mixture.

2. The process according to claim 1, wherein said step (c) is conducted at a temperature of from 900° C. to 1000° C.

* * * * *